UNITED STATES PATENT OFFICE.

FRANZ MÜLLER, OF WESTEND-CHARLOTTENBURG, GERMANY, ASSIGNOR TO THEODOR TEICHGRAEBER, OF BERLIN, GERMANY.

YOHIMBIN PREPARATIONS AND PROCESS OF MANUFACTURING SAME.

996,274.  Specification of Letters Patent.  Patented June 27, 1911.

No Drawing. Application filed June 24, 1910. Serial No. 568,644.

*To all whom it may concern:*

Be it known that I, FRANZ MÜLLER, a subject of the German Emperor, and resident of Westend-Charlottenburg, in the Kingdom of Prussia, German Empire, have invented new and useful Improvements in Yohimbin Preparations and in the Processes of Manufacturing Same, of which the following is a full, clear, and exact specification.

Yohimbin and its salts, which have hitherto been used in medicine exclusively as aphrodisiacs, have the disadvantage that they are sparingly soluble in water and are apt to separate from their solutions; moreover, they stimulate the respiration. The effect of the salts as aphrodisiacs, although desirable in many cases, is injurious when the salts are to be used, in illnesses involving enhanced blood pressure, for the purpose of dilating the vascular system and thus lowering the blood pressure. If this effect of yohimbin on the vascular system, which was closely investigated for the first time by myself, is to be applied, it is necessary to find soluble compounds of yohimbin with bodies which eliminate the stimulation of the respiration and the sexual organs, without at the same time influencing the effect of dilatation of the vascular system.

By my invention I make yohimbin preparations having very valuable therapeutic properties in the direction indicated. For this purpose I treat a salt of yohimbin in aqueous, alcoholic or other solution, with at least one molecular proportion of a nitrogen compound which, while neutral in reaction, possesses at the same time basic and acid groups, such as urethanes, amino-acids, acid amids, ureas, or imino compounds with acid groups, like caffein. It is also feasible to arrive at like compounds of yohimbin by treating the free yohimbin base with the salts which the aforesaid neutral compounds form with acids.

Although in this specification I have described the products as compounds, I am not sure that they are indeed chemical compounds. This applies especially to those products that are obtained with more than one molecular proportion of the nitrogen compound. The quantity of the latter is variable within wide limits, provided it is not inferior to one molecular proportion, and I do not wish to limit myself to any specified proportion. In the following examples which relate to products containing one or two molecular proportions of the nitrogen compounds, the products are described as compounds for the sake of shortness.

Example 1: 45 grams of yohimbin nitrate (1 molecular proportion) are dissolved in 1 liter of hot water together with 9 grams of ethyl urethane (1 molecular proportion) and the solution is evaporated in a vacuum. A yellowish white crystalline powder is thus obtained, melting at 260–261° C. with decomposition and easily soluble without being decomposed in cold and hot water and alcohol of 90 per cent. strength. The compound is insoluble in ether, ligroin, and benzene. By diluted mineral acids it is dissolved without decomposition if carefully heated; from this solution diluted alkalis precipitate the yohimbin base. By cold diluted alkalis the compound is not dissolved and when heated it is decomposed. The composition of the product corresponds to the formula

$C_{22}H_{28}N_2O_3$ being taken as the formula of yohimbin the composition of which is not yet established with absolute certainty.

Example 2: 40 grams of pure yohimbin base (1 molecular proportion) are suspended in 1 liter of hot water in which the base is almost insoluble, and mixed with 15.5 grams of ethyl urethane nitrate (1 molecular proportion). Solution occurs almost instantaneously. The solution is evaporated in a vacuum, when it yields the same product, melting at 260–261° C., as is obtained by the method described in Example 1.

Example 3: Alpha amino-oxy-iso-butyric acid is finely powdered and dissolved in boiling water and then mixed with a solution of an equimolecular proportion of yohimbin nitrate in hot water. The solution is evaporated in a vacuum and finally completely dried over sulfuric acid. A yellowish white microcrystalline product is obtained, melting at 260–261° C. with decomposition. It is sparingly soluble in boiling alcohol of 90 per cent. strength, insoluble in ether, ligroin and benzene, soluble in hot water, in boiling glacial acetic acid and diluted mineral acid. From the latter solution diluted alkalis precipitate the yohimbin base. The compound is insoluble in diluted alkalis by which it is decomposed. The composition of the product corresponds to the formula

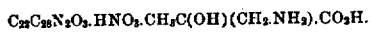

Example 4: Equimolecular proportions of acetic amid and yohimbin nitrate are dissolved in alcohol of 90 per cent. strength and evaporated to dryness in a vacuum at gentle heat. Finally the product is completely dried over sulfuric acid. A yellowish white microcrystalline non-smelling powder is obtained melting at 269–270° C. with decomposition. It is dissolved without decomposition in hot water, alcohol of 90 per cent. strength and diluted acids when carefully heated. Ammonia precipitates the yohimbin base from the cold solution in acids. By diluted alkalis the product is not dissolved, but decomposed already at low temperature. The compound is not soluble in ether, ligroin and benzene. The composition of the product corresponds to the formula

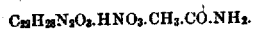

Example 5: Salicylic amid and yohimbin nitrate are dissolved in hot water in equimolecular proportions; the solution is filtered and evaporated to dryness in a vacuum. Finally the product is completely dried over sulfuric acid. A yellowish white crystalline powder is obtained, melting with decomposition at about 245° C. It is soluble in hot water and alcohol of 90 per cent. strength, insoluble in ether, ligroin and benzene. In diluted mineral acids the compound is soluble without remarkable decomposition when carefully heated. When adding diluted alkalis to the solution the yohimbin base is precipitated. In diluted alkalis the compound is insoluble and easily decomposed. The composition of the product corresponds to the formula

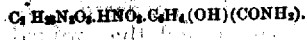

Example 6: Equimolecular proportions of urea and yohimbin nitrate are dissolved in hot water and the filtered solution is evaporated in a vacuum at low temperature. Finally the product is completely dried over sulfuric acid. A nearly white microcrystalline powder is obtained, melting at 254–255° C. with decomposition. The product is soluble in hot water, in alcohol of 90 per cent. strength and in diluted mineral acids. By adding diluted alkalis to the aqueous solution the free yohimbin base is precipitated. The product is insoluble in ether, ligroin and benzene. It is also insoluble in diluted alkalis by which it is decomposed already at low temperature. The composition of the product corresponding to the formula

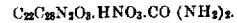

Example 7: Succinic imid and yohimbin nitrate are dissolved in hot water in equimolecular proportions. The solution is filtered and evaporated to dryness in a vacuum. Finally the product is completely dried over sulfuric acid. Yellowish rhombohedric crystals are obtained, melting at 252–254° C. with decomposition. The product is soluble in hot water and alcohol of 90 per cent. strength, easily soluble in diluted acids from which solutions diluted alkalis precipitate the yohimbin base. In ether, benzene and xylol the product is insoluble; it is also insoluble in diluted alkalis. The composition of the product corresponds to the formula

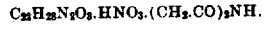

Example 8: Equimolecular proportions of caffein and yohimbin nitrate are dissolved in hot water. The solution is filtered and evaporated in a vacuum at as low a temperature as possible. Finally the product is completely dried over sulfuric acid. A yellowish white microcrystalline powder is obtained, melting at 247–249° C. with decomposition. The product is easily soluble in hot water and alcohol of 90 per cent. strength and soluble in diluted acids. From the latter solutions diluted ammonia precipitates the yohimbin base. In diluted alkalis the product is insoluble and is decomposed. The product is also insoluble in ether, benzene and acetone. The composition of the product corresponds to the formula

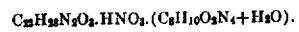

Example 9: Two molecular proportions of ethyl urethane and one molecular proportion of yohimbin nitrate are dissolved in hot water. The solution is filtered and evaporated to dryness in a vacuum at as low a temperature as possible. The product is then completely dried over sulfuric acid. A yellowish white microcrystalline powder is obtained, melting at 272–275° C. with decomposition. The product is easily soluble in hot water and alcohol of 90 per cent. strength, insoluble in ether, ligroin and benzene. In diluted mineral acids it is soluble without decomposition when carefully heated. Diluted alkalis precipitate the free yohimbin base from this solution. Diluted alkalis do not dissolve the compound which is decomposed when heated therewith. The composition of the product corresponds to the formula

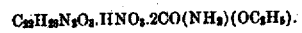

In all these examples other yohimbin salts can be substituted for yohimbin nitrate. Of course, also mixtures of different yohimbin salts can be used, mixed products being thus obtained.

What I claim is:—

1. The herein described manufacture of yohimbin preparations soluble in water by bringing together a yohimbin salt with a derivative which, while neutral in reaction, contains both basic and acid groups, one of these two constituents being bound to an acid to form a salt.

2. The herein described manufacture of yohimbin preparations soluble in water by bringing together a yohimbin salt with a nitrogen derivative which, while neutral in reaction, contains both basic and acid groups.

3. The herein described manufacture of yohimbin preparations soluble in water by bringing together, in a suitable solvent, yohimbin with a nitrogen derivative which, while neutral in reaction, contains both basic and acid groups, one of these two constituents being bound to an acid to form a salt, and causing the solvent to evaporate.

4. The herein described manufacture of yohimbin preparations soluble in water by bringing together, in a suitable solvent, a yohimbin salt with a nitrogen derivative which, while neutral in reaction, contains both basic and acid groups, and causing the solvent to evaporate.

5. The herein described water soluble composition, comprising yohimbin, a nitrogen derivative which, while neutral in reaction, contains both basic and acid groups, and an acid bound to one of said constituents.

6. The herein described water soluble composition, comprising yohimbin, a urethane, and an acid bound to one of said constituents.

7. The herein described water soluble composition, comprising yohimbin, ethyl urethane and nitric acid, the latter being bound to one of said constituents, said product forming a yellowish white crystalline powder melting at 260 to 261° C. with decomposition, soluble in water and in alcohol of 90 per cent. strength, insoluble in ether, ligroin and benzene, the composition of said product corresponding to the formula

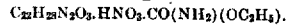
$C_{21}H_{26}N_2O_3.HNO_3.CO(NH_2)(OC_2H_5)$.

In testimony, that I claim the foregoing as my invention, I have signed my name in presence of two subscribing witnesses.

FRANZ MÜLLER.

Witnesses:
HENRY HASPER,
WOLDEMAR HAUPT.